United States Patent
Marschall et al.

(10) Patent No.: US 7,624,191 B2
(45) Date of Patent: Nov. 24, 2009

(54) TRANSMISSION OF CALL-RELATED DATA IN A COMMUNICATIONS SYSTEM

(75) Inventors: Andreas Marschall, Essen (DE); Otto Schroeter, Essen (DE)

(73) Assignee: Siemens Aktiengesellschaft, Munich (DE)

(*) Notice: Subject to any disclaimer, the term of this patent is extended or adjusted under 35 U.S.C. 154(b) by 570 days.

(21) Appl. No.: 10/304,012

(22) Filed: Nov. 26, 2002

(65) Prior Publication Data

US 2003/0120783 A1 Jun. 26, 2003

(30) Foreign Application Priority Data

Nov. 30, 2001 (DE) ............... 101 58 748

(51) Int. Cl.
G06F 15/16 (2006.01)
G06F 15/173 (2006.01)
H04M 1/56 (2006.01)
H04M 15/06 (2006.01)
H04M 3/42 (2006.01)

(52) U.S. Cl. ............ 709/238; 709/227; 379/142.06; 379/201.01

(58) Field of Classification Search ........ 709/227, 709/238; 379/142.06, 88.19, 212.01, 114.06, 379/88.22, 401, 201.01, 211.01
See application file for complete search history.

(56) References Cited

U.S. PATENT DOCUMENTS

| | | | |
|---|---|---|---|
| 5,953,332 A * | 9/1999 | Miloslavsky | 370/352 |
| 6,038,293 A * | 3/2000 | McNerney et al. | 379/88.19 |
| 6,192,118 B1 | 2/2001 | Bayless et al. | |
| 6,252,947 B1 | 6/2001 | Diamond et al. | |
| 6,292,555 B1 * | 9/2001 | Okamoto | 379/265.01 |
| 6,735,208 B1 * | 5/2004 | Riemann et al. | 370/401 |
| 6,785,370 B2 * | 8/2004 | Glowny et al. | 379/88.22 |
| 6,795,542 B1 * | 9/2004 | St. Jean | 379/212.01 |

(Continued)

FOREIGN PATENT DOCUMENTS

EP 0 721 266 7/1996

(Continued)

OTHER PUBLICATIONS

NetWare, Telephony Services Application Programming Interface (TSAPI) Version 2, Issue 3.0, Apr. 1998, Novel Inc., Lucent Technologies Inc.

(Continued)

Primary Examiner—Larry D Donaghue
Assistant Examiner—Brian J Gillis
(74) Attorney, Agent, or Firm—Staas & Halsey LLP

(57) ABSTRACT

A method for transmitting data in a CTI communications system in the $3^{rd}$ party configuration, employs a communications system having a plurality of terminals which, for a communication connection between two or more terminals, generates a call which comprises prescribed information about the connection, a TSP and a plurality of clients which are connected to the TSP and communicate with the TSP via a CTI interface. For the purpose of transmitting files or logging data between the clients, the invention proposes transmitting the data for transmission from one of the clients to the TSP via the CTI interface and writing them to a prescribed memory area for the call. These data can be read by the other clients associated with the call, likewise via the CTI interface.

17 Claims, 3 Drawing Sheets

U.S. PATENT DOCUMENTS

| | | | |
|---|---|---|---|
| 2002/0056000 A1* | 5/2002 | Albert Coussement | 709/225 |
| 2003/0086556 A1* | 5/2003 | Welch et al. | 379/265.09 |
| 2004/0028213 A1* | 2/2004 | Goss | 379/265.09 |
| 2004/0081301 A1* | 4/2004 | Phillips | 379/114.06 |

FOREIGN PATENT DOCUMENTS

| | | |
|---|---|---|
| EP | 0 847 178 | 6/1998 |
| EP | 1 001 589 | 5/2000 |

OTHER PUBLICATIONS

Office Action issued in corresponding German Patent Application No. 10158748.1-31 on Apr. 7, 2006.

Search Report issued in corresponding European Patent Application No. 02024603 on Feb. 27, 2004.

* cited by examiner

TRANSMISSION OF CALL-RELATED DATA IN A COMMUNICATIONS SYSTEM

CROSS REFERENCE TO RELATED APPLICATIONS

This application is based on and hereby claims priority to German Application No. 10158748.1 filed on Nov. 30, 2001, the contents of which are hereby incorporated by reference.

BACKGROUND OF THE INVENTION

The invention relates particularly to a method for transmitting data in a CTI communications system in the $3^{rd}$ party configuration.

CTI communications systems (CTI: Computer Telephony Integration) allow data interchange between telecommunications hardware, such as a telephone system, and a computer or a computer-protected software application. In terms of the arrangement of the telecommunications system and computer system, essentially two configurations are distinguished, the "$1^{st}$ party configuration" and the "$3^{rd}$ party configuration".

In the $1^{st}$ party configuration, a telephone is respectively connected directly to a computer. By contrast, in a CTI communications system in the $3^{rd}$ party configuration, a network of telecommunications equipment communicates with a computer network via a server.

A typical example of a CTI communications system in the $3^{rd}$ party configuration is shown in FIG. 1.

FIG. 1 shows a communications system 1 having a plurality of terminals 2a-2c connected thereto. These can be, as shown, telephones or any other type of data transmission equipment connected to the communications system 1 by an exchange line, such as fax machines.

The communications system 1 is connected by a data line 9 to a server 4, which is used as a TSP (Telephony Service Provider) and to which a plurality of client computers 3a-3c are in turn connected via an LAN (Local Area Network).

FIG. 2 shows the interconnection of the CTI communications system again in the form of a block diagram, with the interfaces between the individual blocks being shown.

As can be seen, the TSP 4 communicates with the communications system via a "CSTA interface" 8 (CSTA: Computer Supported Telephony Application interface) which defines the signal protocol between the server 4 and the telecommunications network 1. By contrast, the clients 3a-3c or the software applications 6a,6b running thereon for managing telecommunications-related data, which are also referred to as CTI or TAPI applications (TAPI: Telephony Application Programming Interface), communicate with the TSP 4 via a CTI interface 7. In the present example, the CTI interface is in the form of a TAPI interface.

With this system, a user of one of the clients 3a-3c can obtain particular prescribed information about a connection which is active in the communications system 1. This information can be, by way of example, the length of a telephone conversation conducted between two terminals 2a,2b, the subscribers involved in the conversation, charges etc., which are displayed to the user, for example in the software application running on his client 3a-3c.

All the information and characteristic data relating to a communication connection are summarized in a "call". This is an abstract unit which can be regarded as a data packet and has the prescribed contents, such as an identification number, the terminals 2a-2c involved in the connection, and other information relating to the connection.

Calls are always generated by the communications system 1 when a connection (call or conversation) has been set up between at least two terminals 2a-2c.

A call model used in CTI communications systems is shown in FIG. 3 for the purpose of illustration. Accordingly, a call 5 storing data relating to the connection is shown between the terminals 2a-2c.

This call 5 is transmitted via a data line 9 to the server 4, from where it is distributed further to prescribed clients 3a-3c. The information contained in the call is thus available on all the clients 3a-3c associated with the call.

Normally, a terminal 2a-2c has only one respective client 3a-3c associated with it, which means that the call is forwarded only to those clients 3a-3c which are associated with the call or with the terminals 2a-2c listed in the call.

The user of the client 3a is thus able, by way of example, to retrieve information about a conversation on the associated telephone 2a, but not on the telephone 2c.

State changes in a communication connection, e.g. as a result of a conversation being ended or of another subscriber being added (conference call), are constantly monitored by the communications system 1 and an appropriately modified call is forwarded to the server 4. When a connection from a terminal 2a-2c is ended, the corresponding entry for the terminal (e.g. 2a) is erased in the call, so that the call is now associated only with the other clients. When a conversation between just two subscribers is ended, the associated call is erased completely.

Data transmission in this known CTI communications system has to date been limited to the transmission of information data relating to an ongoing connection. It has not been possible to transmit files between individual clients 3a-3c to date. It is also not possible to obtain information about those terminals 2a-2c which were involved in a call in the past and to implement a type of call tracking.

It is therefore one possible object of the present invention to allow data to be interchanged between the clients in a communications system.

The fundamental concept described below involves transmitting either entire files or data for call tracking (logging data) from a client to a TSP via the CTI interface and storing them in a prescribed memory area for an associated call. These files or data can then be read by another client associated with the call, likewise via the CTI interface.

In this case, logging data are to be understood to mean data which indicate which subscribers were involved in an existing connection in the past.

The files or logging data are thus transmitted between client and server in a simple manner using the already existing CTI interface, which means that no other interface needs to be opened.

To store the files or logging data in the associated call, it is necessary, as mentioned, for the call to have an additional memory area to which the data to be inserted can be written. This additional memory area can have a size of several KB, e.g. 64 KB.

In line with one preferred embodiment, the logging data comprise, by way of example, the length of a conversation, the subscribers involved in the conversation, or the type of connection (call, conversation or call forwarding etc.).

This allows a call to log information regarding all the terminals which were associated with this call over its entire course. For this purpose, each client or each CTI software application writes prescribed data relating to its associated terminal into the associated call. This is preferably done at the start and end of a connection (e.g. when ringing or after hanging up), so that at least the start and end of a connection are recorded.

When diverting a call or transferring from one terminal to another, each of the associated clients preferably enters data, particularly the subscriber or user on the associated terminal, into the associated call, so that ultimately a type of connection history is produced. Since this information is available to all the clients associated with the call, the connection history for this call is thus available to all (including recently added) associated clients. A subscriber recently added to an existing call is thus shown the connections active to date on his client computer.

The connection history comprises at least the names of the users of terminals with which the call has been associated to date. In addition, the connection history can contain data relating to the length of the connection, to the type of connection, to the date, time, etc.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
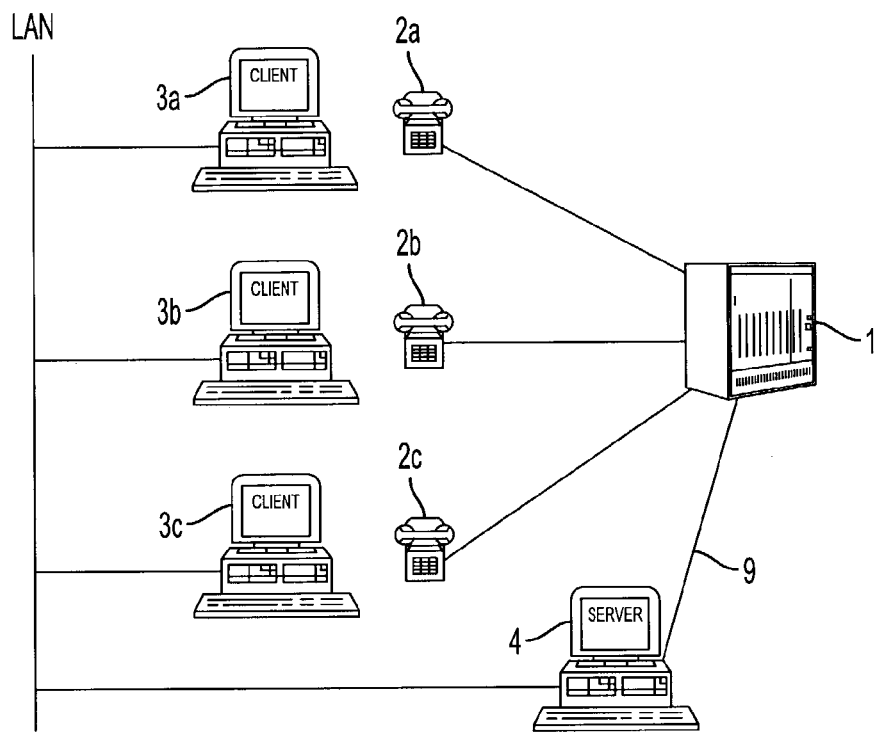
FIG. 1 shows a known CTI communications system in the $3^{rd}$ party configuration.

Reference will now be made in detail to the preferred embodiments of the present invention, examples of which are illustrated in the accompanying drawings, wherein like reference numerals refer to like elements throughout.

Figure 2:
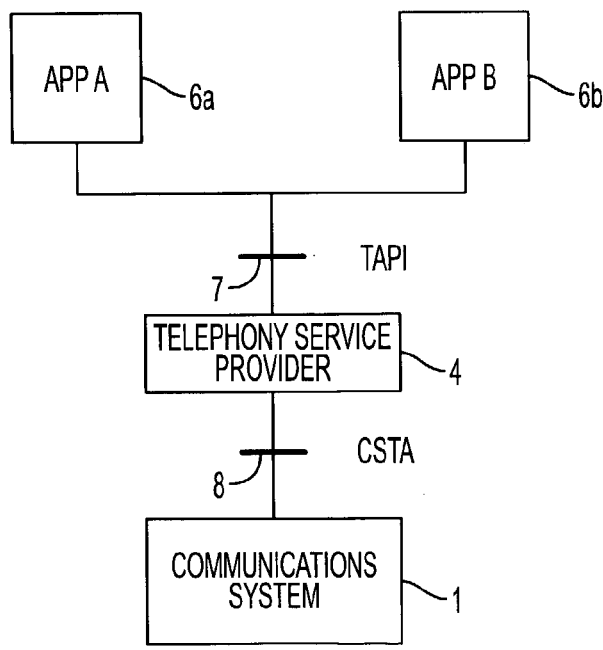
FIG. 2 shows a block diagram of the CTI communications system from FIG. 1, with the communications interfaces shown.
Figure 3:
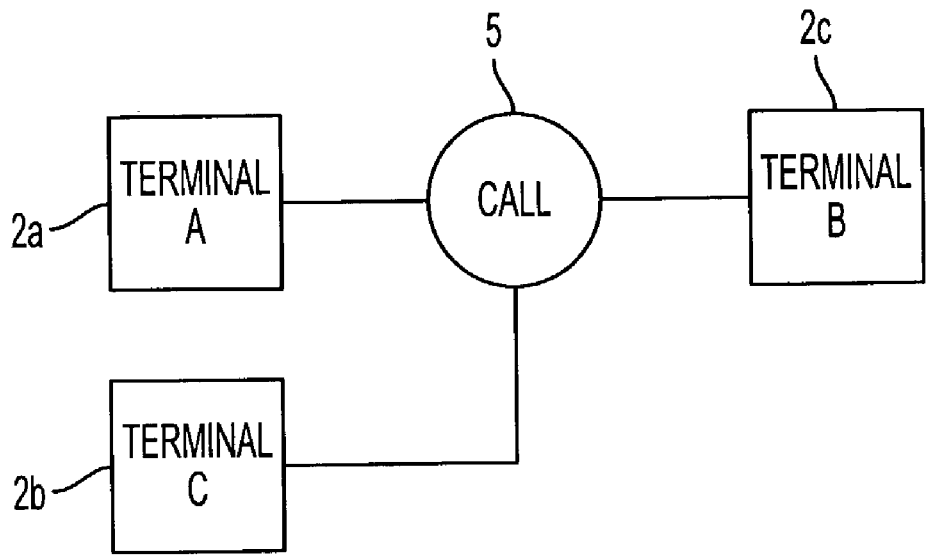
FIG. 3 shows an example of a call model for a CTI communications system.

For the explanation of FIGS. 1 to 3, reference is made to the introduction to the description.

Figure 4:
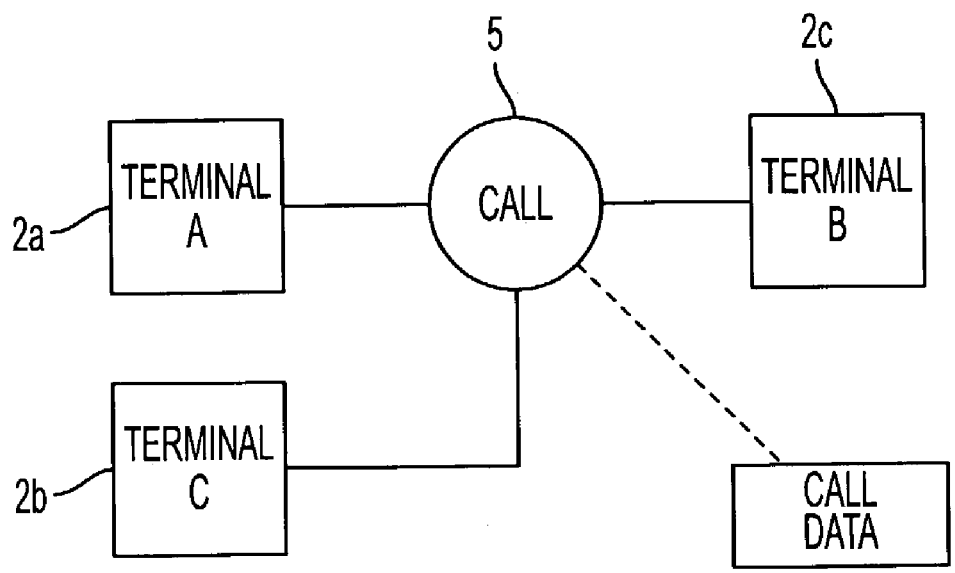
FIG. 4 shows a schematic illustration to explain a basic principle of one embodiment of the invention.

FIG. 4 shows a call model for CTI communications systems, where a plurality of terminals 2a-2c, such as telephones, are connected to one another. The key connection data are recorded in a call 5 which contains, by way of example, information about which subscribers are involved in the conversation, how long the conversation has already lasted on the individual terminals 2a-2c or what the call numbers of the subscribers are.

The call 5 is buffer-stored on the server 4, for example, and is constantly updated by the communications system 1. In addition, the call 5 can be read by all the clients 3a-3c associated with it, and the information contained in the call can be displayed on the screen on the clients 3a-3c.

The data record (call) 5 has a prescribed memory area which can be used to store any data, such as files or other information. It is thus possible for data to be written directly into the call 5 or into a memory associated with the call 5 from a client (3a-3c) via the CTI interface (TAPI) 7 and for the data to be read and displayed by another of the clients 3a-3c. This makes it a simple matter to make files or logging data directly available to an interlocutor.

This becomes particularly user-friendly if it is possible to send a file by a drag & drop operation using a software application running on the clients 3a-3c. All the received files or information are displayed to the interlocutor in a browser window, for example, and they can thus easily be opened using the appropriate software application.

Figure 5:
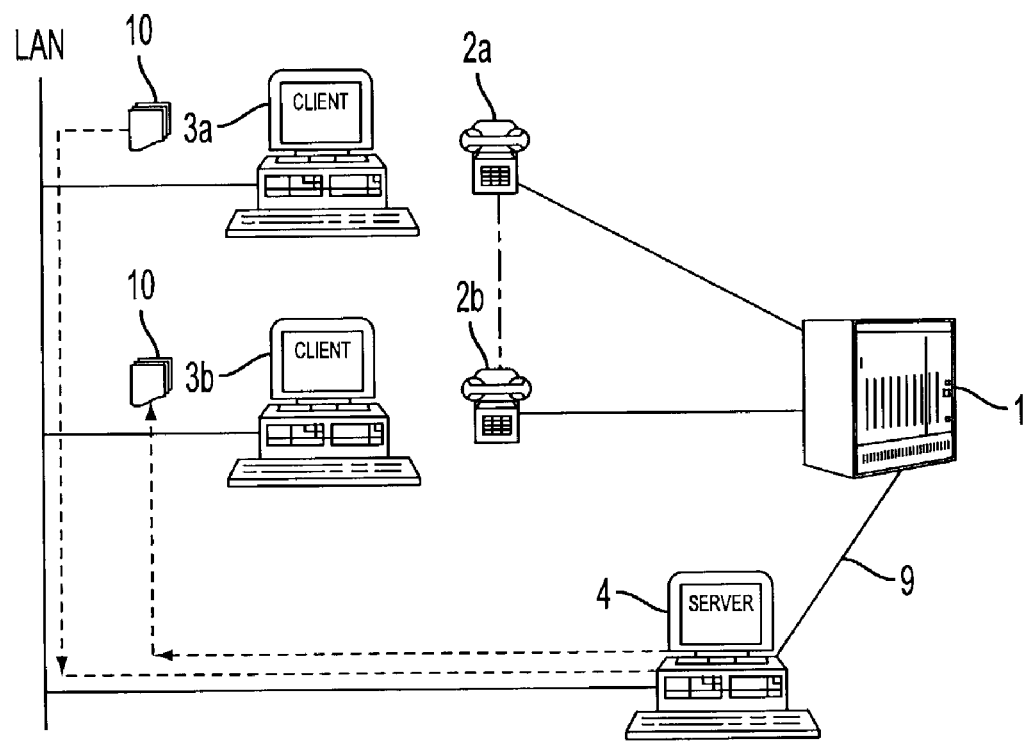
FIG. 5 shows the transmission of files in a CTI communications system in line with an exemplary embodiment of the invention.

FIG. 5 shows the transmission of files or logging data 10 in a CTI communications system in the $3^{rd}$ party configuration. In this context, it is assumed that there is a connection—illustrated by the dash-dot line—between the telephones 2a, 2b, and the connection data have been recorded in a call 5 which is buffer-stored on the server 4. It is also assumed that the client 3a is associated with the telephone 2a and that the client 3b is associated with the telephone 2b.

To transmit files 10 from the client 3a to the client 3b, the subscriber on the telephone 2a first selects the files 10 which are to be transmitted and sends them to the server 4 using a specific software application (not shown). In this case, the transmission is made via the CTI interface 7. The files 10 are finally added to the call 5. Since the call 5 is also associated with the client 3b, the transmitted files 10 can also be retrieved by the interlocutor on the client 3b.

The call 5 can also be used to log the connection data for all the terminals 2a-2c which were associated with this call over its course. For this purpose, when it is allocated a call 5, each client 3a-3c or the CTI software application running thereon enters the connection data for the associated terminal 2a-2c into the relevant memory area for the call 5. This can be done during actual ringing which the terminal 2a-2c receives or during a conversation. This information 10 can be retrieved by each client 3a-3c whose associated terminal 2a-2c is presently involved in the connection.

The example below is intended to illustrate the method:

| | | | Caller: 02302 815 1734 Mueller KG | | |
|---|---|---|---|---|---|
| Date | Time | Length | Name | Call number | Call/ Connected |
| Jan. 21, 2000 | 8:00:00 | 00:00:30 | Mr Meier | 100 | Call, forw. |
| Jan. 21, 2000 | 8:00:30 | 00:00:10 | Mr Schulz | 120 | Call |
| Jan. 21, 2000 | 8:00:40 | 00:02:00 | Mr Schulz | 120 | Conversation, connec. |
| Jan. 21, 2000 | 8:02:40 | 00:00:20 | Mr Hell | 130 | Call |

Row 1 of the table indicates that a Mr Meier was called on 01.21.00 at 8.00 am and, since he was not at his desk, the call was forwarded to Mr Schulz after 30 seconds. This information was entered into the associated call 5 by the associated client 3a, for example at the end of the call.

Row 2 shows that Mr Schulz, whose call number is 120, picked up the receiver after 10 seconds and started a conversation. This was again entered into the call by the associated client 3b.

Row 3 indicates that Mr Schulz transferred the call to Mr Hell after 2 minutes. This was also entered into the associated call 5 as appropriate by the client 3b.

As can be seen, the telephone (call) then rang on the desk of Mr Hell, whose call number is 130 and who had not picked up after 20 seconds.

When Mr Schreiber then picked up the receiver, the screen on his client 3c showed him which subscribers 2a-2c were already involved in this telephone conversation before him.

This makes it possible to prevent a caller from being forwarded several times in the loop. In addition, the called party can adapt his behavior according to what stations have already been called by the caller.

The invention has been described in detail with particular reference to preferred embodiments thereof and examples, but it will be understood that variations and modifications can be effected within the spirit and scope of the invention.

What is claimed is:

1. A method for transmitting data in a computer telephony interface (CTI) communications system having a server and at least first through third clients connected to the server via a CTI interface, each of the clients being assigned at least one terminal such that the first client has at least one first client terminal and the second client has at least one second client terminal, the method comprising:
  generating prescribed connection information in a centralized device of the CTI communications system, the prescribed connection information being generated when at least a first client terminal and second client terminal are connected in a current connection, the prescribed connection information describing the current connection, the prescribed connection information being stored in a prescribed memory area of the server;
  transmitting a data file associated with the current connection from the first client having the first client terminal involved in the current connection to the server via the CTI interface, the data file being transmitted with assistance of the prescribed connection information stored in the server;
  storing the data file in the prescribed memory area for the associated prescribed connection information; and
  forwarding the data file from the prescribed memory area to at least the second client having the second client terminal involved with the current connection, the data file being forwarded with assistance of the prescribed connection information stored in the server.

2. The method as claimed in claim 1, wherein data file is sent from and received by the clients using a computer telephony integration transfer software application.

3. The method as claimed in claim 2, wherein data file is inserted into the computer telephony integration transfer software application by a drag and drop operation.

4. The method as claimed in claim 1, wherein a representation of the data file received at the server from one of the clients is displayed in a browser window of at least one other client.

5. The method as claimed in claim 1, wherein the data file can be written to and read from the prescribed memory area by all clients having a terminal associated with the connection.

6. The method as claimed in claim 5, wherein when a call contains a plurality of connections, the method further comprises logging prescribed data for all connections which have been set up over the course of the call, thus producing a connection history.

7. The method as claimed in claim 6, wherein the connection history contains information about which terminals were associated with each connection over the course of the call.

8. The method as claimed in claim 7, wherein a client having a terminal involved in one of the connections writes prescribed information into the connection history regarding its terminal's involvement in the call.

9. The method as claimed in claim 8, wherein the connection history contains at least names of users of the terminals involved in the call.

10. The method as claimed in claim 9, wherein the CTI communications system is operated as a computer telephony integration communications system in a $3^{rd}$ party configuration.

11. The method as claimed in claim 1, wherein when a call contains a plurality of connections, the method further comprises logging prescribed data for all connections which have been set up over the course of the call, thus producing a connection history.

12. The method as claimed in claim 11, wherein the connection history contains information about which terminals were associated with each connection over the course of the call.

13. The method as claimed in claim 11, wherein a client having a terminal involved in one of the connections writes prescribed information into the connection history regarding its terminal's involvement in the call.

14. The method as claimed in claim 11, wherein the connection history contains at least names of users of the terminals involved in the call.

15. The method as claimed in claim 1, wherein the CTI communications system is operated as a computer telephony integration communications system in a $3^{rd}$ party-configuration.

16. A method for transmitting data in a communications system having a centralized device, a server, and at least first and second clients connected to the server via a computer telephony integration (CTI) interface, each of the clients being assigned at least one terminal such that the first client has at least one first client terminal and the second client has at least one second client terminal, the method comprising:
  generating prescribed connection information in the centralized device, when at least a first client terminal and a second client terminal are connected in a current connection, the prescribed connection information being stored in a call-specific memory area of the server, the prescribed connection information describing the current connection;
  selecting a data file at the first client having the first client terminal involved with the current connection;
  transmitting the data file from the first client to the server via the CTI interface, the data file being transmitted with assistance of the prescribed connection information stored in the server;
  storing the data file in the call-specific memory area of the server;
  forwarding the data file from the call-specific memory area of the server to at least the second client having the second client terminal involved with the current connection, the data file being forwarded with assistance of the prescribed information stored in the server; and
  maintaining the data file in the call-specific memory area of the server after the current connection is terminated.

17. The method as claimed in claim 16, further comprising obtaining the data file from the call-specific memory area of the server, the data file being obtained by the second client during a subsequent connection.

* * * * *